United States Patent
Shin et al.

(10) Patent No.: US 7,633,585 B2
(45) Date of Patent: Dec. 15, 2009

(54) LIQUID CRYSTAL DISPLAY INCLUDING A LIQUID CRYSTAL MOLECULE HAVING TWO OR MORE AXES

(75) Inventors: Sung-Tae Shin, Yongin-si (KR); Kung-Won Rhie, Seoul (KR); Jae-Jin Lyu, Gwangju-si (KR); Kyeong-Hyeon Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 453 days.

(21) Appl. No.: 11/400,102

(22) Filed: Apr. 7, 2006

(65) Prior Publication Data
US 2006/0256275 A1 Nov. 16, 2006

(30) Foreign Application Priority Data
May 16, 2005 (KR) .................. 10-2005-0040659

(51) Int. Cl.
*G02F 1/1335* (2006.01)
*C09K 19/52* (2006.01)
(52) U.S. Cl. ................. 349/120; 252/299.01
(58) Field of Classification Search ............... 349/120; 252/299.01; 428/1.1
See application file for complete search history.

(56) References Cited
U.S. PATENT DOCUMENTS
6,493,055 B1 * 12/2002 Shimoshikiryo et al. .... 349/141
2001/0028427 A1 10/2001 Kitson et al.

FOREIGN PATENT DOCUMENTS

| JP | 08240819    | 9/1996  |
|----|-------------|---------|
| JP | 2003 315825 | 11/2003 |
| JP | 2004 004384 | 1/2004  |
| KR | 2001 0090582| 10/2001 |
| KR | 2001 0090586| 10/2001 |
| KR | 2001 0107162| 12/2001 |

OTHER PUBLICATIONS

English Abstract for Publication No. 08-240819.

(Continued)

*Primary Examiner*—David Nelms
*Assistant Examiner*—David Y Chung
(74) *Attorney, Agent, or Firm*—F. Chau & Associates, LLC (57) ABSTRACT

An LCD includes a plurality of electro-optical switches (pixels), each electro-optical switch includes a plurality of liquid crystal molecules, wherein each molecule has a first portion with a first long axis (a motional axis) and a second portion with a second long axis (a control axis). Each molecule may further include a third (shorter) axis. The first axis and the second axis cross each other and each axis is orthogonal to the other two axes. The first portion of each liquid crystal molecule has a positive dielectric anisotropy while the second portion of each liquid crystal molecule may have either a positive or negative dielectric anisotropy. The LCD may further include a first panel, a second panel that is opposite to the first panel, two field-generating electrodes that are included for each pixel in at least one of the two panels, and the plurality of liquid crystal molecules are interposed between the first panel and the second panel.

23 Claims, 9 Drawing Sheets

OTHER PUBLICATIONS

English Abstract for Publication No. 2001-0107162.
English Abstract for Publication No. 2001-0090586.
English Abstract for Publication No. 2001-0090582.
English Abstract for Publication No. 2003-315825.
English Abstract for Publication No. 2004-004384.

* cited by examiner

LIQUID CRYSTAL DISPLAY INCLUDING A LIQUID CRYSTAL MOLECULE HAVING TWO OR MORE AXES

BACKGROUND OF THE INVENTION

1. Field of the Invention

The present invention relates to a liquid crystal display (LCD), and more particularly to LCDs comprising a plurality of electro-optical switches (pixels) comprising a plurality of liquid crystal molecules having more than one axis.

2. Description of the Related Art

Recently, liquid crystal displays (LCDs) have been the most widely used among flat panel display devices. Generally, an LCD includes a pair of opposing panels one of which has a plurality of pixel-controlling electrodes on it inner surface, and the other having a common electrode, with a dielectric anisotropy liquid crystal (LC) layer interposed between the panels.

In an LCD, a variation of the voltage difference applied between the field generating electrodes, i.e., a variation in the strength of an electric field generated by the electrodes, changes the transmittance of light passing through the LCD, and thus desired images are obtained by controlling the voltage difference between the electrodes at each pixel.

Liquid crystals are partly ordered materials, somewhere between their solid and liquid phases. Their molecules are often shaped like rods or plates. Depending on the kind of technique used to align LC molecules in the LC layer, LCDs are categorized into three types: twisted nematic (TN) mode, in-plane switching (IPS) mode, and vertical alignment (VA) mode LCDs. Of the three types, a nematic LC material is most commonly used. Each of the liquid crystal pixel cells in a LCD acts as an electro-optical switch that controls the light transmission from the back light in response to an electrical signal applied to a signal electrode of a TFT.

The LCDs using the nematic LC material can obtain a wider viewing angle by appropriately designing the form of the electrodes and by controlling a field direction, but they still have limitations in response speed and visibility.

SUMMARY OF THE INVENTION

An aspect of the present invention provides an LCD with improved response speed and visibility. Another aspect of the invention provides a fast acting electro-optical switch. An LCD according to an embodiment of the invention includes a plurality of electro-optical switches (pixels), each electro-optical switch includes a plurality of liquid crystal molecules, wherein each molecule has a first portion with a first (long) axis (a motional axis) and a second portion with a second (long) axis (a control axis). Each molecule may further include a third (shorter) axis. The first axis and the second axis cross each other and each axis is orthogonal to the other two axes. The LCD may further include a first panel, a second panel that is opposite to the first panel, two field-generating electrodes that are included for each pixel in at least one of the two panels, and the plurality of liquid crystal molecules are interposed between the first panel and the second panel. In each of the plurality of electro-optical switches (pixels), the plurality of liquid crystal molecules are interposed between the two field-generating electrodes so that the optical vector of each of the plurality of liquid crystal molecules may be switched between a bright (light transmissive), to a dark (light blocking) position.

An aspect of the invention provides an electro-optical switch comprising: a plurality of liquid crystal molecules, wherein each of the liquid crystal molecules has a first portion with a first axis and a second portion with a second axis perpendicular to the first axis. The first axis may be a motional axis and the second axis is a control axis. The first portion has a positive dielectric anisotropy while the second portion has a negative dielectric anisotropy or a positive dielectric anisotropy.

According to an aspect of the present invention, there is provided an LCD that includes a first panel, a second panel (opposite to the first panel), two field-generating electrodes (e.g., one included in each of the two panels, or both electrodes disposed on one of the panels), and a plurality of liquid crystal molecules (interposed between the first panel and the second panel) that each includes a first portion with a first long axis and a second portion with a second long axis.

Preferred embodiments of the present invention will now be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of the layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

BRIEF DESCRIPTION OF THE DRAWINGS

The above objects and other advantages of the present invention will become more apparent to those skilled in the art by describing the preferred embodiments thereof in more detail with reference to the accompanying drawings, in which:

FIG. 4A and FIG. 4B show the alignment states of the LC molecule of FIG. 1 when the LCD of FIG. 2 and FIG. 3 is in a "normally white" mode;

FIG. 5A and FIG. 5B show the alignment states of the LC molecule of FIG. 1 when the LCD of FIG. 2 and FIG. 3 is in a "normally black" mode;

DETAILED DESCRIPTION OF THE PREFERRED EMBODIMENTS

Figure 1:
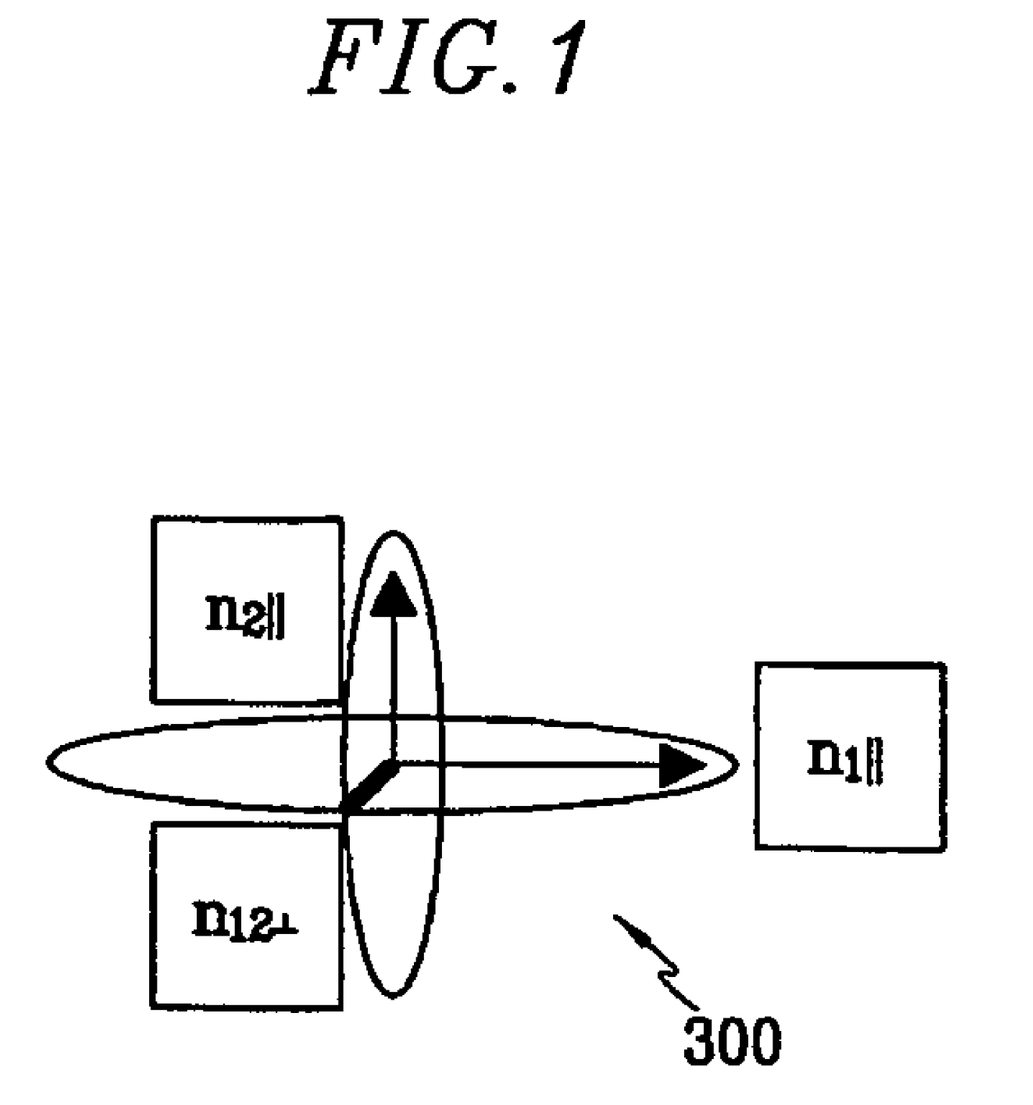
FIG. 1 is a schematic view of an LC molecule according to an embodiment of the present invention.

FIG. 1 is a schematic view of an LC molecule according to an embodiment of the present invention.

Referring to FIG. 1, an LC molecule 300 includes a first long axes $n_1$ and a second long axis $n_2$ that are crossed with each other (orthogonal to each other) in the form of a cross, and a third axis $n_{12}$ that is formed perpendicular to (orthogonal to both of) the two axes $n_1$ and $n_2$ at the crossing point of the first and second axes.

When an electric field is applied to the LC molecule 300, the first long axis $n_1$ acts as a motional axis of the molecule 300, while the second axis $n_2$ acts as a control axis that controls the molecular motion. In this structure, since the motional direction of the LC molecule 300 is easily determined by the control axis (i.e., the second axis), response speed can be improved. Also, when the LC molecule 300 with the cross-shaped structure is suitably aligned, a viewing angle becomes wider and visibility is improved.

Here, both of the long axes $n_1$ and $n_2$ may exhibit positive dielectric anisotropic characteristics. It is also possible that the first long axis $n_1$ has positive dielectric anisotropy while the second long axis $n_2$ has negative dielectric anisotropy.

Hereinafter, an LCD utilizing the above-mentioned LC molecule will be described in more detail with reference to accompanying drawings.

Figure 2:
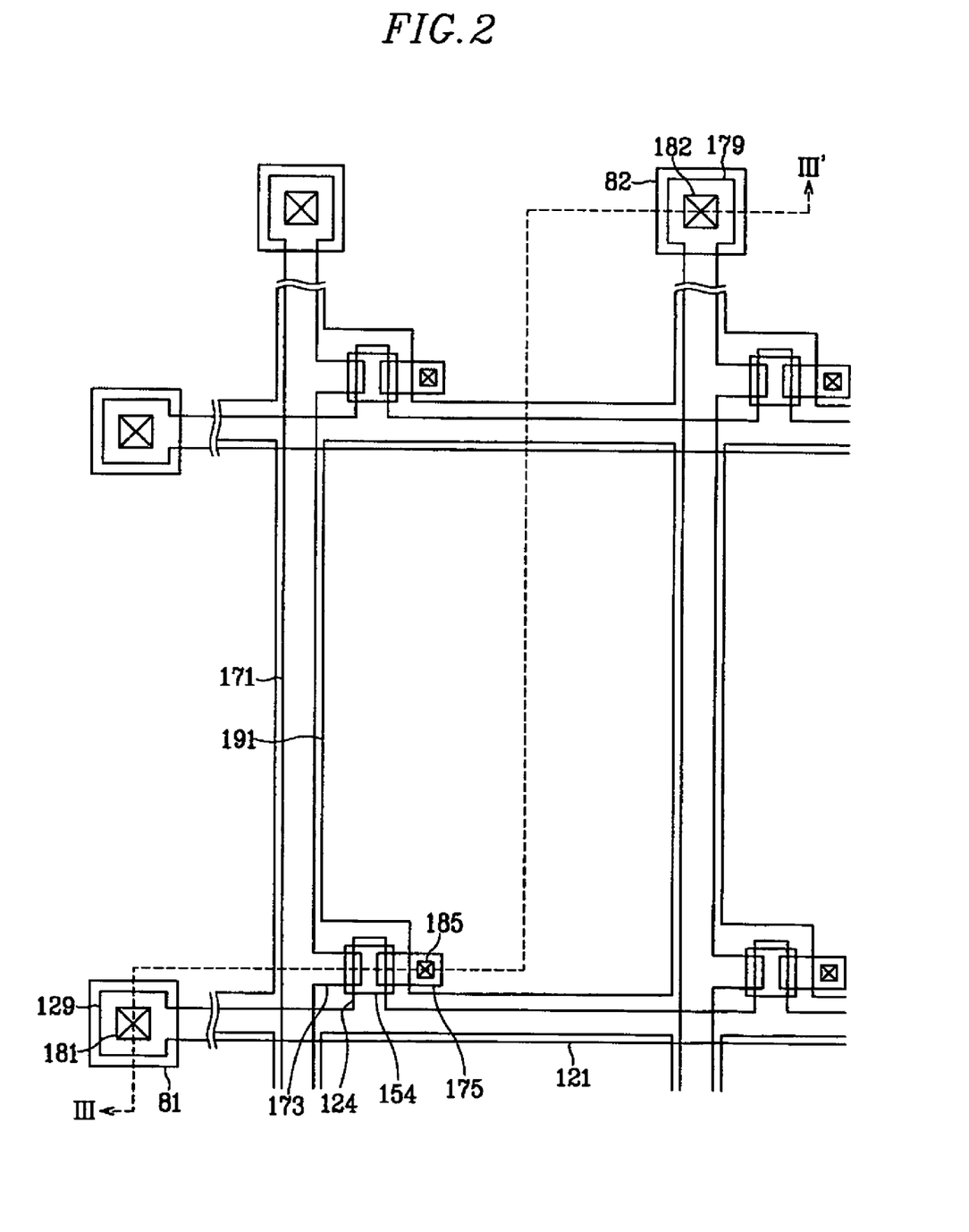
FIG. 2 is a layout view of an LCD comprising a plurality of LC molecules of FIG. 1, according to an embodiment of the present invention.
Figure 3:
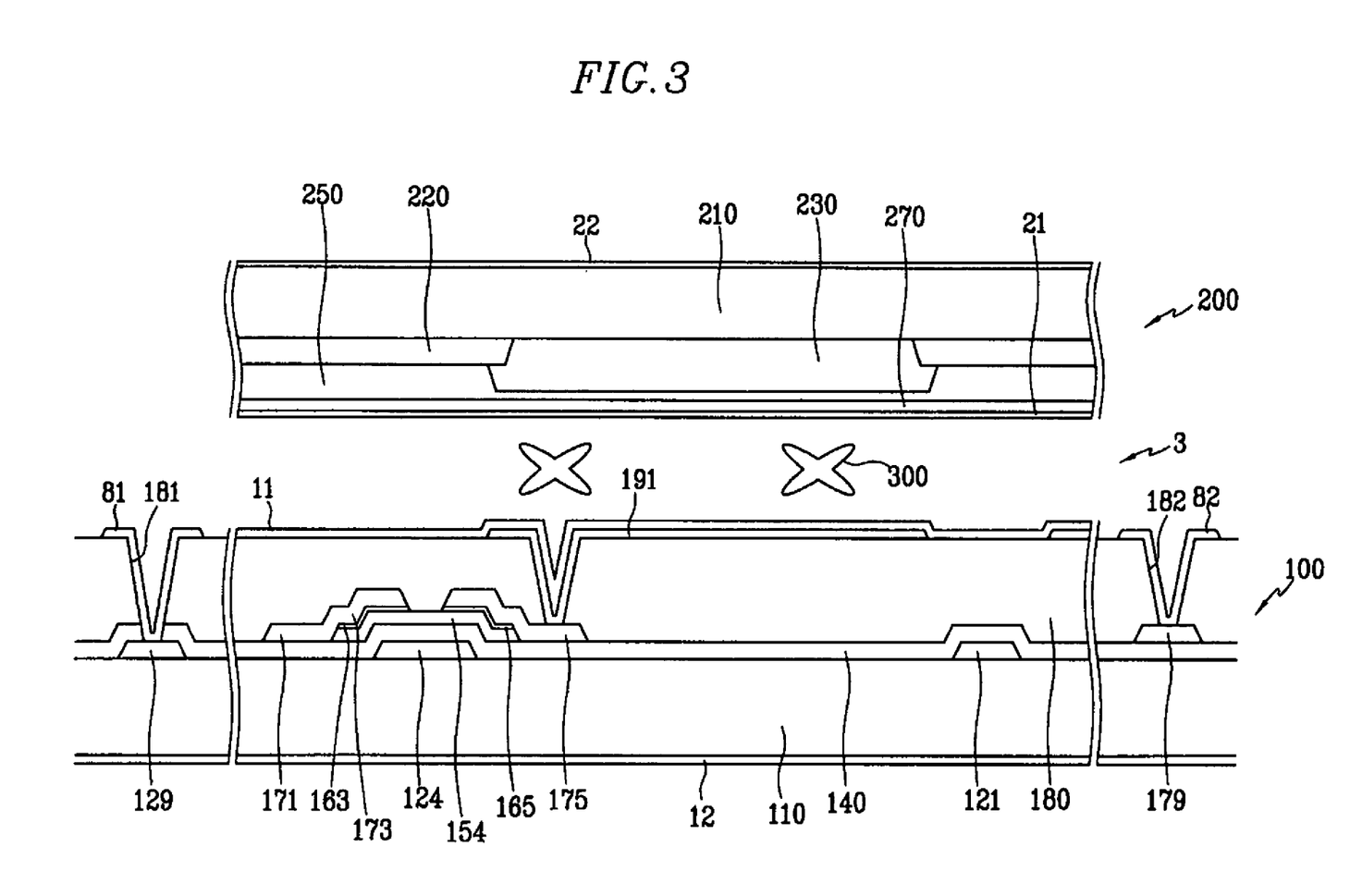
FIG. 3 is a cross-sectional view of the LCD of FIG. 2 along section line III-III' in FIG. 2.

FIG. 2 is a layout view of an LCD comprising a plurality of LC molecules 300 of FIG. 1, according to an embodiment of the present invention; and FIG. 3 is a cross-sectional view of the LCD of FIG. 2 along section line III-III' in FIG. 2.

Referring to FIG. 2 and FIG. 3, the LCD includes a TFT array panel 100 (with a plurality of TFTs arranged in a matrix array) and a color filter array panel 200 facing each other, and an LC layer 3 interposed therebetween.

The TFT array panel 100 is configured as follows.

A plurality of gate lines 121 are formed on an insulating substrate 110 made of transparent substrate (e.g., glass or plastic). The gate lines 121 are configured to transmit gate signals and extend in parallel with each other substantially in a horizontal direction. Each gate line 121 includes a plurality of gate electrodes 124 protruding into each pixel and an end (terminal) portion 129 having a relatively large dimension to be connected to a different layer or to an external device. Gate drivers (not shown) for generating the gate signals may be mounted on a flexible printed circuit (not shown) attached to the substrate 110, or directly on the substrate 110. Otherwise, the gate drivers may be integrated into the substrate 110. In this case, the gate lines 121 are directly connected to the gate drivers.

The gate lines 121 are preferably made of an aluminum-(Al) containing metal such as Al and an Al alloy, a silver-(Ag) containing metal such as Ag and a Ag alloy, a gold-(Au) containing metal such as Au and a Au alloy, a copper-(Cu) containing metal such as Cu and a Cu alloy, a molybdenum-(Mo) containing metal such as Mo and a Mo alloy, chrome (Cr), titanium (Ti), or tantalum (Ta). The gate lines 121 may be configured as a multi-layered structure, in which at least two conductive layers (not shown) having different physical properties are included. In such a structure, one of the two conductive layers is made of a low resistivity metal, such as an Al-containing metal, a Ag-containing metal, a Cu-containing metal, or the like, in order to reduce delay of the signals or voltage drop in the gate lines 121. The other of the two conductive layers is made with other materials such as indium tin oxide (ITO), indium zinc oxide (IZO), etc. Besides the above-listed materials, various metals and conductors can be used for the formation of the gate lines 121.

All lateral sides of the gate lines 121 preferably slope in the range from about 30° to 80° to the surface of the substrate 110. A gate insulating layer 140 made of silicon nitride ($SiN_x$) or silicon oxide ($SiO_2$) is formed on the gate lines 121.

A plurality of semiconductor islands (isolated semiconductor areas) 154 made of hydrogenated amorphous silicon (abbreviated as "a-Si") or polysilicon are formed on the gate insulating layer 140. Each semiconductor island 154 overlaps one of the gate electrodes 124, with the gate insulating layer 140 interposed therebetween.

A plurality of ohmic contacts 163 and 165 are formed on the semiconductors 154. The ohmic contacts 163 and 165 may be made of N+ hydrogenated amorphous silicon that is highly doped with N-type impurities such as phosphorus (P), or silicide. A set of the ohmic contacts 163 and 165 is placed on the semiconductor 154. All lateral sides of the semiconductors 154 and the ohmic contacts 163 and 165 slope in the range from about 30° to 80° to the surface of the substrate 110.

A plurality of data lines 171 (and source electrodes 173) and a plurality of drain electrodes 175 are formed on the ohmic contacts 163 and 165 and on the gate insulating layer 140.

The data lines 171 for transmitting data signals extend in parallel with each other substantially in a vertical direction perpendicular to the gate lines 121. Each data line 171 includes a plurality of source electrodes 173 extending toward the respective gate electrodes 124, and an end (terminal) portion 179 having a relatively large dimension to be connected to a different layer or an external device. Data drivers (not shown) for generating the data signals may be mounted on a flexible printed circuit (not shown) attached to the substrate 110, or directly on the substrate 110. Otherwise, the data drivers may be integrated into the substrate 110. In this case, the data lines 171 are directly connected to the data drivers. The drain electrodes 175 separated from the data lines 171 are opposite to the source electrodes 173, centering on the gate electrodes 124.

A gate electrode 124, a source electrode 173, a drain electrode 175, and a semiconductor 151 form one thin film transistor (TFT). A TFT (semiconductor, transistor) channel is formed in the semiconductor island 154 between the source electrode 173 and the drain electrode 175.

The data lines 171 and the drain electrodes 175 are preferably made of a refractory metal such as Mo, Cr, Ta, or Ti, or alloys thereof, and may be configured as multi-layered structures including a refractory metal layer (not shown) and a low resistivity conductive layer (not shown). A desirable example of the multi-layered structure is a lower layer made of one among Cr, Mo, and a Mo alloy, and an upper layer made of Al or an Al alloy. Another example is a lower layer made of Mo or a Mo alloy, an intermediate layer made of Al or an Al alloy, and an upper layer made of Mo or a Mo alloy. Besides the above-listed materials, various metals and conductors can be used for the formation of the data lines 171 and the drain electrodes 175. All lateral sides of the data lines 171 and the drain electrodes 175 preferably slope in the range from about 30° to 80° to the surface of the substrate 110.

A passivation layer 180 is formed on the data lines 171, the drain electrodes 175, and the exposed portions of the semiconductors 154. The passivation layer 180 may be made of an inorganic insulator such as SiNx or $SiO_2$. The passivation layer 180 may also be made of an organic insulator or a low dielectric insulator, both having a dielectric constant of below 4.0. Desirable examples of the low dielectric insulator are a-Si:C:O, a-Si:O:F, etc., produced by plasma enhanced chemical vapor deposition (PECVD). The preferable organic insulator has photosensitivity and planarization properties. Due to this insulator, the passivation layer 180 may have a flat surface. However, the passivation layer 180 may be configured as a double-layered structure including a lower inorganic insulator layer and an upper organic insulator layer. This structure has an insulating property, allowing no damage to the exposed portions of the semiconductors 154.

The passivation layer 180 is provided with a plurality of contact holes 182 and 185, through which the end portions 179 of the data lines 171 and the drain electrodes 175 are exposed, respectively. A plurality of contact holes 181 are formed in the passivation layer 180 and the gate insulating layer 140, and the end portions 129 of the gate lines 121 are exposed therethrough.

A plurality of pixel electrodes 191 and a plurality of contact assistants 81 and 82 are formed on the passivation layer 180.

The pixel electrodes 191 are made of a transparent conductor such as ITO or IZO and are physically and electrically connected to the drain electrodes 175 through the contact holes 185 in order to receive data voltages from the drain electrodes 175. The pixel electrodes 191 supplied with the data voltages generate electric fields in cooperation with a common electrode 270 of the color filter array panel 200, determining the orientations of LC molecules 300 in the LC layer 3 interposed between the two electrodes 191 and 270.

The contact assistants 81 and 82 are connected to the end portions 129 of the gate lines 121 and the end portions 179 of the data lines 171 through the contact holes 181 and 182, respectively. The contact assistants 81 and 82 facilitate adhesion between the exposed end portions 129 and 179 and exterior devices, and protect them.

An alignment layer 11 is formed on the passivation layer 180 to uniformly align the LC molecules 300 (FIG. 1) within the LC layer 3.

The color filter array panel 200 is configured and made as follows.

A light-blocking member 220 called "a black matrix" is provided on an insulating substrate 210 made of transparent glass or plastic. The light-blocking member 220 prevents light from leaking out through barriers between the pixel electrodes 191 and defines aperture regions facing the pixel electrodes 191.

A plurality of color filters 230 are formed on the substrate 210. Most of the color filters 230 are placed within the aperture regions delimited by the light-blocking member 220. The color filters 230 may extend over and along the respective pixel electrodes 191 in a vertical direction. Each color filter 230 may exhibit one color among the colors, red, green, and blue. An overcoat layer 250 made of a transparent organic material is formed on the light-blocking member 220 and the color filters 230. The common electrode 270, made of a transparent conductive material such as ITO or IZO, is formed on the overcoat layer 250. An alignment layer 21 is formed on the common electrode 270 to uniformly align the LC molecules 300 (FIG. 1 & FIG. 3) in the LC layer 3.

A polarizer 12 and an analyzer 22 are respectively attached to the outer surfaces of the two panels 100 and 200. Their transmission axes are disposed parallel to or perpendicular to each other. Either of the two may be omitted. The LC layer 3 with the LC molecules 300 (FIG. 1 & FIG. 3) is interposed between the two panels 100 and 200 facing each other.

Each LC molecule 300 (FIG. 1 & FIG. 3) includes a first long axis $n_1$ and a second long axis $n_2$ that cross each other (perpendicularly, in the form of a cross), and may further include a third axis $n_{12}$ that is formed perpendicular (orthogonal) to both long axes $n_1$ and $n_2$ (at the crossing point of the two axes $n_1$ and $n_2$). Both of the long axes $n_1$ and $n_2$ may exhibit positive dielectric anisotropic characteristics. Alternatively, it is also possible that the first long axis $n_1$ has positive dielectric anisotropy while the second long axis $n_2$ has negative dielectric anisotropy.

FIG. 4A through FIG. 5B show pixels of the LCD shown in FIG. 2 and is FIG. 3 with various alignment states of the cross-shaped LC molecule 300 of FIG. 1 & FIG. 3 having two long axes. In the figures, "N" denotes the case when no electric field is applied to the LC molecule 300 (e.g., no voltage applied across the LC layer between the panels) and "Y" denotes the case when an electric field is applied to the LC molecule 300.

Figure 4A:
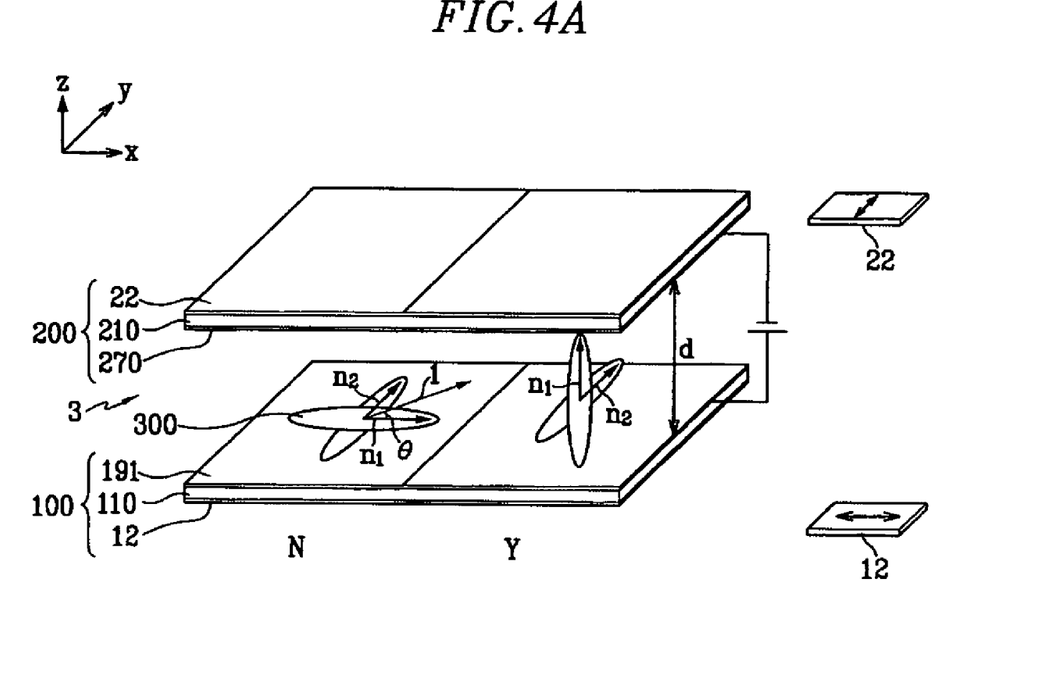
Figure 4B:
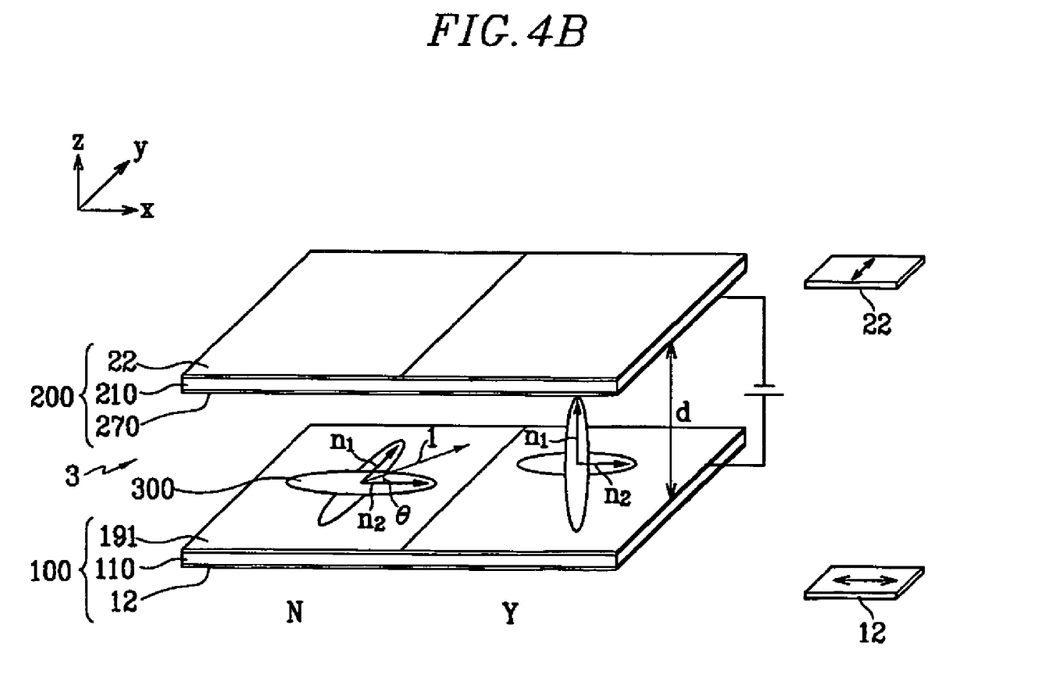

FIG. 4A and FIG. 4B show the alignment states of the LC molecule 300 when the LCD is in a "normally white" mode. Here, the transmission axes of the polarizer 12 and the analyzer 22 are mutually crossed at a right angle, and both of the long axes $n_1$ and $n_2$ of the LC molecule 300 exhibit positive dielectric anisotropic characteristics.

The left "N" pixel of FIG. 4A shows the alignment state of the LC molecule 300 to which no electric field is applied. In this case, the LC molecule 300 has three axes $n_1$, $n_2$, and $n_{12}$ that are aligned in the X, Y, and Z directions, respectively ($n_{12}$ is not shown). Of the three axes, the first axis $n_1$ is parallel to the transmission axis of the polarizer 12, while the second axis $n_2$ is perpendicular to the transmission axis of the polarizer 12. The sum of vectors of the two axes $n_1$ and $n_2$ becomes an optical axis 1 of the LC molecule 300.

The left "N" pixel of FIG. 4B shows another alignment state of the LC molecule 300 to which no electric field is applied. Here, the first axis $n_1$ is perpendicular to the transmission axis of the polarizer 12, while the second axis $n_2$ is parallel to the transmission axis of the polarizer 12. The sum of vectors of the two axes $n_1$ and $n_2$ becomes an optical axis 1 of the LC molecule 300.

In both cases shown in FIG. 4A and FIG. 4B, the optical axis 1 of the LC molecule 300 with no electric field is formed at an angle of θ to the transmission axis of the polarizer 12. Accordingly, when light that is polarized by the polarizer 12 travels through the LC molecule 300, the LC molecule 300 converts the polarization state of the light to be parallel to the transmission axis of the analyzer 22, so that the light exits the analyzer 22. At this time, such a pixel of the LCD screen is seen to a viewer as being white (or a color having a positive, or maximum luminance). In this case, if the refractive indices of the two axes $n_1$ and $n_2$ are equal to each other and the thickness d of the LC layer 3 is controlled so that the light exhibits a phase difference of 180° before and after passing through the LC layer 3, the largest brightness state, (in which the largest possible amount of light exits the LCD), can be obtained. In other words, if the thickness d of the LC layer 3 is controlled so that the light that is linearly polarized by the LC molecule 300 rotates by 90°, the white state with the maximum luminance can be obtained.

Next, the right "Y" pixel of FIG. 4A and FIG. 4B show the alignment states of the LC molecule 300 to which an electric field is applied. In FIG. 4A, the first axis $n_1$ with the positive dielectric anisotropy is in the field-applied direction (i.e., in the Z direction), while the second axis $n_2$ with the negative dielectric anisotropy is parallel to the surfaces of the two substrates 110 and 210 (i.e., in the Y direction). In other words, the first axis $n_1$ having the positive dielectric anisotropy rotates 90°, centering (pivoting, rotating) on the second axis $n_2$ having the negative dielectric anisotropy, so that the optical axis 1 of the LC molecule 300 becomes perpendicular to the transmission axis of the polarizer 12. Accordingly, light that is polarized by the polarizer 12 travels through the LC molecule 300 without a change of the polarization state, and is then blocked by the analyzer 22. At this time, the LCD (pixel) becomes "black". In this case, the first axis $n_1$ acts as a motional axis of the LC molecule 300, while the second axis $n_2$ acts as a control axis that controls the molecular motion.

Excepting that the second axis $n_2$ is oriented in the X direction, all characteristics shown in "Y" case of FIG. 4A are also exhibited in "Y" of FIG. 4B, so that so that the optical axis 1 of the LC molecule 300 becomes perpendicular to the transmission axis of the analyzer 22. Accordingly, light that is polarized by the polarizer 12 travels through the LC molecule 300 without a change of the polarization state, and is then blocked by the analyzer 22

Figure 5A:
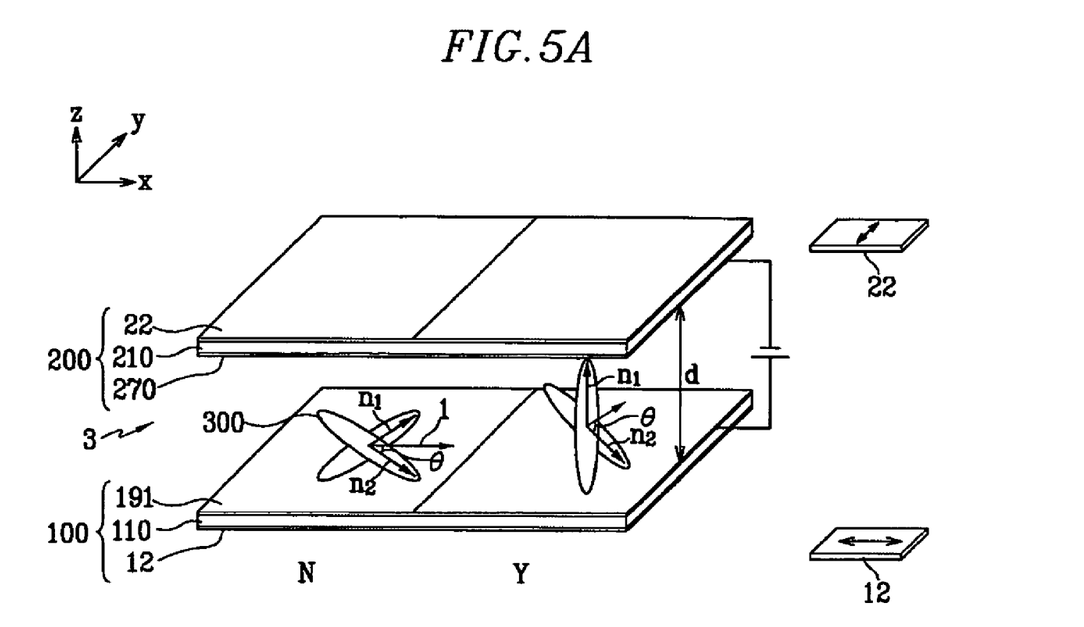
Figure 5B:
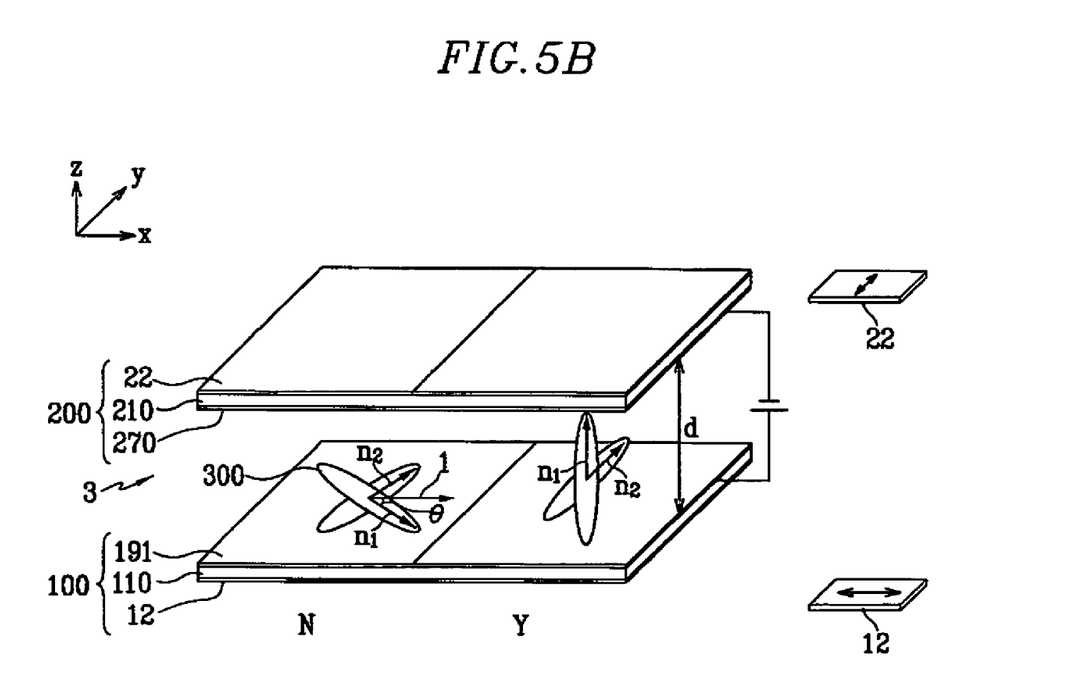

FIG. 5A and FIG. 5B shows the alignment states of the LC molecule 300 (of FIG. 1) when the LCD is in a "normally black" mode. Here, the transmission axes of the polarizer 12 and the analyzer 22 mutually cross at a right angle, and two long axes $n_1$ and $n_2$ of the LC molecule 300 have different dielectric anisotropic characteristics from each other.

The left "N" pixel of FIG. 5A shows the alignment state of the LC molecule 300 to which no electric field is applied. In this case, the LC molecule 300 has three axes $n_1$, $n_2$, and $n_{12}$ that are aligned in the X, Y, and Z directions, respectively ($n_{12}$ is not shown). Particularly, the second axis $n_2$ is aligned at an angle of θ to the transmission axis of the polarizer 12 and the first axis $n_1$ is aligned at an angle of 90-θ (ninety minus theta) to the transmission axis of the polarizer 12. The sum of the vectors of the two axes $n_1$ and $n_2$ becomes an optical axis 1 of the LC molecule 300.

The left "N" pixel of FIG. 5B shows another alignment state of the LC molecule 300 to which no electric field is applied. In this case, differing from the case shown in the left "N" pixel in FIG. 5A, the first axis $n_1$ is formed at an angle of θ to the transmission axis of the polarizer 12 and the second axis $n_2$ is formed at an angle of 90-θ to the transmission axis of the polarizer 12. The sum of two vectors of the axes $n_1$ and $n_2$ becomes an optical axis 1 of the LC molecule 300.

In each "N" case shown in FIG. 5A and FIG. 5B, the optical axis 1 of the LC molecule 300 in pixels with no applied electric field is parallel to the transmission axis of the polarizer 12, and perpendicular to the transmission axis of the analyzer 22. Accordingly, light that is polarized by the polarizer 12 travels through the "N" LC molecules 300 without a change of the polarization state and is then blocked by the analyzer 22. Thus, the "N" (no electric field) pixels of the LCD screen appear "black".

Meanwhile, the right "Y" pixel portions of FIG. 5A and FIG. 5B each show the alignment states of the LC molecule 300 in a pixel to which an electric field is applied. When the electric field is applied to the LC molecule 300, the first axis $n_1$ with the positive dielectric anisotropy is oriented in the field-applied direction (i.e., in the Z direction), and the second axis $n_2$ with the negative dielectric anisotropy lies on an XY plane that is parallel to the surfaces of the two substrates 110 and 210. In other words, the first axis $n_1$ having the positive dielectric anisotropy rotates 90°, centering on (pivoting, rotating on) the second axis $n_2$ having the negative dielectric anisotropy. In this case, the first axis $n_1$ does not cause a phase retardation in light passing therethrough, while the second axis $n_2$ causes a phase retardation because it is formed at an angle of θ to the transmission axis (X direction) of the polarizer 12. Accordingly, the light successively passes through the polarizer 12 and the LC layer 3, and then exits the analyzer 22. At this time, the "Y" pixels of the LCD screen appear "white" (e.g., color with positive luminance). In this case, if the refractive indices of the two axes $n_1$ and $n_2$ are equal to each other and the thickness d of the LC layer 3 is controlled so that the light exhibits a phase difference of 180° before and after passing through the LC layer 3, the white state with the maximum luminance can be obtained.

Hereinafter, an LCD according to another embodiment of the present invention will be described in detail with reference to the accompanying drawings. A very important feature of this LCD is that all the field-generating electrodes are formed on one (the same) substrate, thus differing from the architecture of the previous embodiment.

Figure 6:
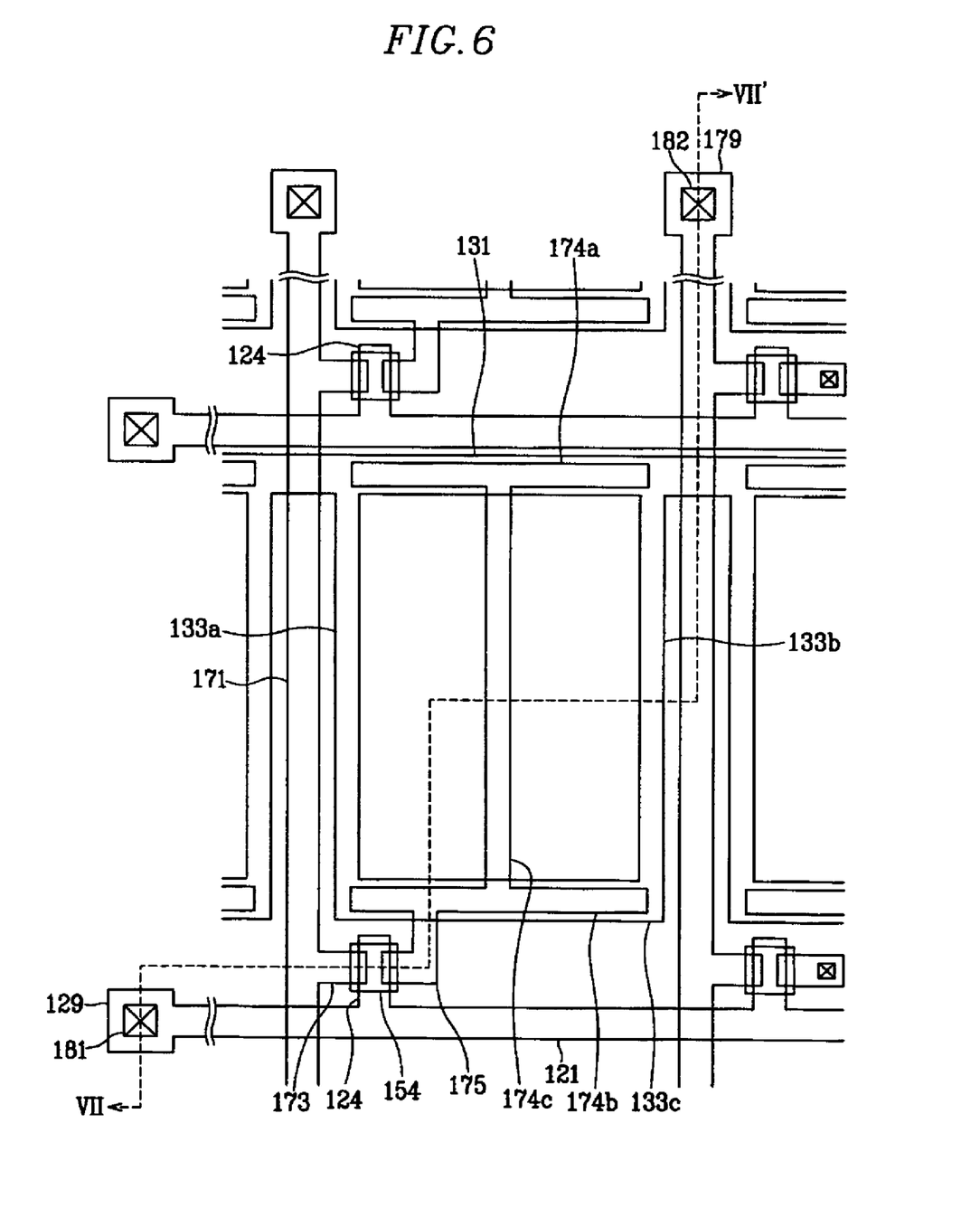
FIG. 6 is a layout view of an LCD according to another embodiment of the present invention.
Figure 7:
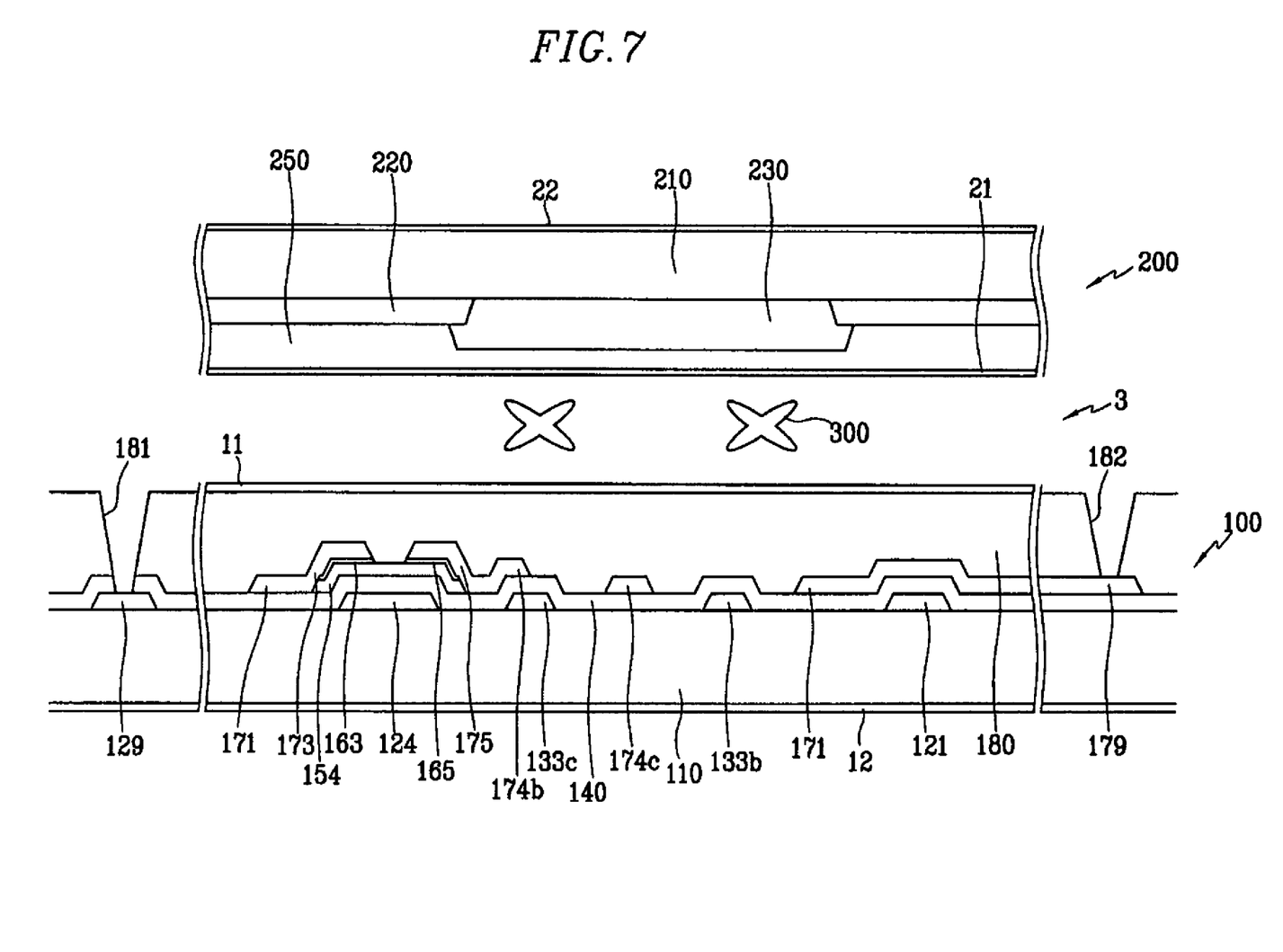
FIG. 7 is a cross-sectional view along section line VII-VII' in FIG. 6.

FIG. 6 is a layout view of an LCD according to another embodiment of the present invention and FIG. 7 is a cross-sectional view along section line VII-VII' in FIG. 6.

Referring to FIG. 6 and FIG. 7, the LCD includes a TFT array panel 100 having a plurality of TFTs and a color filter array panel 200 facing each other, and an LC layer 3 interposed therebetween.

The TFT array panel 100 is configured and made as follows. A plurality of gate lines 121 and a plurality of common electrode lines 131 are formed on an insulating substrate 110 made of transparent material (e.g., glass or plastic).

The gate lines 121 for transmitting gate signals extend parallel with each other substantially in a horizontal direction. Each gate line 121 includes a plurality of gate electrodes 124 protruding upward (into each pixel) and an end portion 129 having a relatively large dimension to be connected to a different layer or an external device.

The common electrode lines 131 for receiving a predetermined (common) voltage extend parallel with each other substantially in a horizontal direction. Each common electrode line 131 includes a plurality of pairs of common electrodes (e.g., 133a and 133b in each pixel) that extend in a vertical direction, and a plurality of common electrodes 133c that are formed in a horizontal direction interlinking at both ends of the common electrodes 133a and 133b. Thus there is at least one common electrode per each pixel in the TFT array panel 100. The vertical common electrodes (e.g., 133a and 133b) in each pixel are disposed and the horizontal common electrode 133c in each pixel, and a (stem) portion of the of the common electrode line 131 form a ring of common electrodes formed around the periphery of each pixel.

A gate insulating layer 140 made of SiNx or $SiO_2$ is formed on the gate lines 121.

A plurality of semiconductor islands 154 made of hydrogenated amorphous silicon (abbreviated as "a-Si") or polysilicon are formed on the gate insulating layer 140. Each semiconductor island 154 overlaps the gate electrode 124, with the gate insulating layer 140 interposed therebetween.

A plurality of pairs of ohmic contacts 163 and 165 are formed on the respective semiconductors 154. A plurality of data lines 171 and a plurality of drain electrodes 175 are formed on the ohmic contacts 163 and 165 and the gate insulating layer 140.

The data lines 171 for transmitting data signals extend substantially parallel to each other in a vertical direction and cross (over) the gate lines 121 and the common electrode lines 131. Each data line 171 includes a plurality of source electrodes 173 extending on the semiconductor islands 154 toward the respective gate electrodes 124, and an end portion 179 having a relatively large dimension to be connected to a different layer or an external device.

A plurality of pixel electrodes are formed in the pixels defined by the intersections of the gate lines 121 and the data lines 171. Each pixel electrode is positioned between the common electrodes 133a and 133b. Each pixel electrode is comprised of an upper horizontal part 174a that is parallel to the gate lines 121, a lower horizontal part 174b that is parallel to the upper horizontal part 174a, and a vertical part 174c that connects a central portion of the upper horizontal part 174a to a central portion of the lower horizontal part 174b. Overlapping of the horizontal parts 174a and 174b over a stem line of the common electrode line 131 and over the horizontal common electrode 133c forms a storage capacitor. A plurality of drain electrodes 175 extending downward from (the lower horizontal parts 174b of) the pixel electrodes 174, partially overlap the semiconductors 154. Each drain electrode 175 is on the opposite side of the transistor's semiconductor channel (over the gate) from the source electrode 173 on the semiconductor 154, centering on the gate electrode 124. The vertical part 174c of the pixel electrode 174 is parallel to the common electrodes 133a and 133b. The vertical part 174c of the pixel electrode 174, when supplied with a voltage, generates an electric field within the pixel in cooperation with the common electrodes 133a and 133b.

A gate electrode 124, a source electrode 173, a drain electrode 175, and a semiconductor channel (the part of the semiconductor island 154 over the gate electrode 124) form a thin film transistor (TFT). The TFT channel is formed in the semiconductor 154 over the gate electrode 124 and between the source electrode 173 and the drain electrode 175.

A passivation layer 180 is formed on the data lines 171 and the drain electrodes 175. The passivation layer 180 is provided with a plurality of contact holes 182, through which the end portions 179 of the data lines 171 are exposed. A plurality of contact holes 181 are formed in the passivation layer 180 and the gate insulating layer 140 to expose the end portions 129 of the gate lines 121. The exposed end portions 129 of the gate lines 121 may be connected to gate drivers. However, in the case that the gate drivers are mounted on the substrate together with the TFTs, the contact holes 181 may be omitted. An alignment layer 11 is formed on the passivation layer 180 to uniformly align the LC molecules 300 in the LC layer 3.

The color filter array panel 200 is configured and made as follows.

A light-blocking member 220 called "a black matrix" is provided on an insulating substrate 210 made of transparent glass or plastic. A plurality of color filters 230 are formed on the substrate 210. Most of them are placed within aperture regions delimited by the light-blocking member 220. No common electrode need be provided in the color filter array panel 200 of FIG. 7, since a common electrode is provided in the TFT array panel 100 of FIG. 7.

An overcoat layer 250 made of an organic material is formed on the color filters 230, and an alignment layer 21 is formed on the overcoat layer 250 to uniformly align the LC molecules 300 in the LC layer 3.

A polarizer 12 and an analyzer 22 are respectively attached to the outer surfaces of the two panels 100 and 200. Their transmission axes are disposed parallel to or perpendicular to each other. Either one of the polarizer 12 and the analyzer 22 may be omitted.

The LC layer 3 with the LC molecules 300 is interposed between the two panels 100 and 200 facing each other.

Each LC molecule 300 includes a first long axis $n_1$ and a second long axis $n_2$ that cross each other (in the form of a cross), and a third axis $n_{12}$ that is formed perpendicular to (orthogonal to) both of the two long axes $n_1$ and $n_2$ at the crossing point of the two long axes $n_1$ and $n_2$. Both of the long axes $n_1$ and $n_2$ may exhibit positive dielectric anisotropic characteristics. Alternatively, it is also possible that the first long axis $n_1$ has positive dielectric anisotropy and the second long axis $n_2$ has negative dielectric anisotropy.

FIG. 8A through FIG. 9B each show one pixel of the LCD shown in FIG. 6 and FIG. 7 with various alignment states of the cross-shaped LC molecule of FIG. 1 & FIG. 7 having two long axes. In the figures, "N" denotes the case when no electric field is applied to the LC molecule 300, and "Y" denotes the case when an electric field is applied to the LC molecule 300.

Figure 8A:
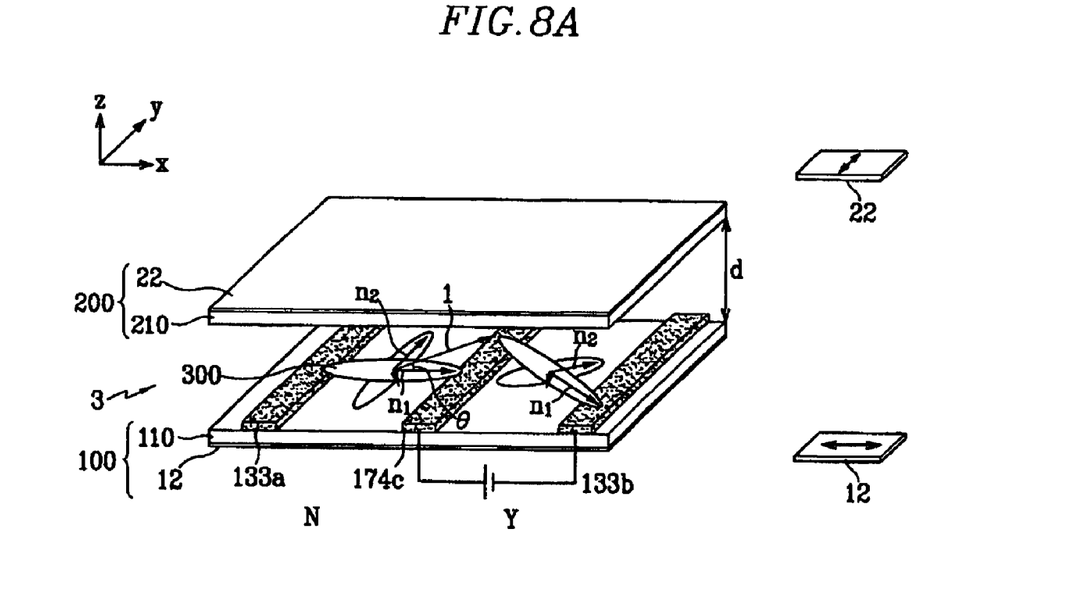
FIG. 8A and FIG. 8B show the alignment states of the LC molecule of FIG. 1 whose two long axes exhibit the same dielectric anisotropic characteristics.
Figure 8B:
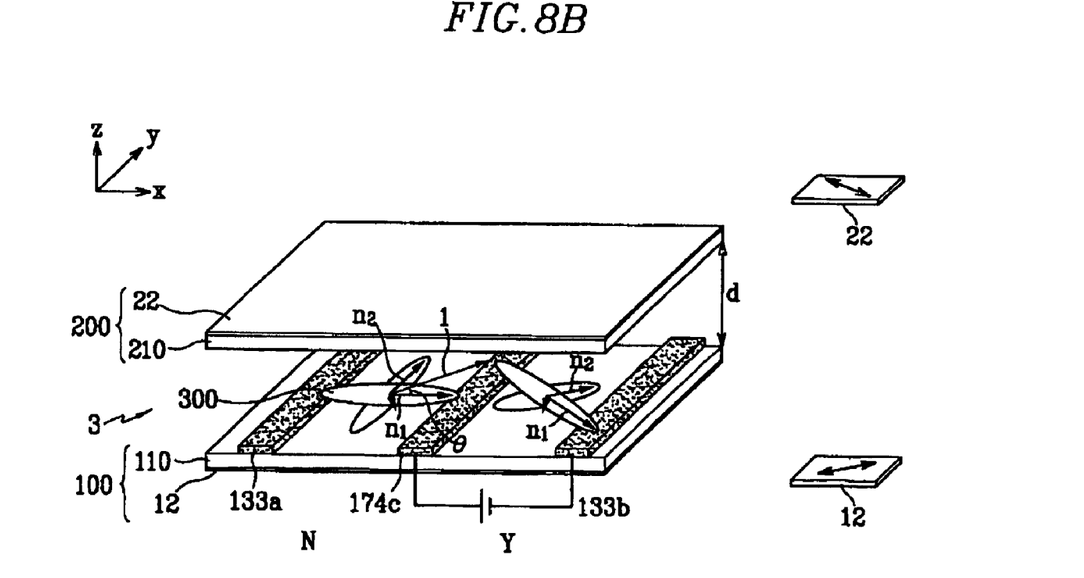

In FIG. 8A and FIG. 8B, both of the long axes $n_1$ and $n_2$ of the LC molecule 300 have positive dielectric anisotropic characteristics, and the transmission axes of the polarizer 12 and the analyzer 22 are mutually crossed at a right angle.

The left half of the pixel of FIG. 8A shows the alignment state of an LC molecule 300 while "N" no electric field is applied. In this "N" case, the LC molecule 300 has three axes $n_1$, $n_2$, and $n_{12}$ that are aligned in the X, Y, and Z directions, respectively ($n_{12}$ is not shown). Of the three, the first axis $n_1$ is parallel to the transmission axis of the polarizer 12, and the second axis $n_2$ is perpendicular to the transmission axis of the polarizer 12. The sum of the two vectors of the axes $n_1$ and $n_2$ becomes an optical axis 1 of the LC molecule 300.

Thus, the optical axis 1 of the LC molecule 300 is formed at an angle of θ to the transmission axis of the polarizer 12. Accordingly, when light travels through the LC layer 3 after passing through the polarizer 12, the light is converted into a component that is parallel to the transmission axis of the analyzer 22, thereby exiting the analyzer 22. At this time, the "N" pixels in the LCD screen appear "white" (or color). In this case, if the refractive indices of the two axes $n_1$ and $n_2$ are equal to each other and the thickness d of the LC layer 3 is controlled so that the light exhibits a phase difference of 180° before and after passing through the LC layer 3, the largest brightness state, (in which the largest possible amount of light exits the LCD), can be obtained. In other words, if the thickness d of the LC layer 3 is controlled so that the light that is linearly polarized by the LC molecule 300 rotates 90°, the "white" state with the maximum luminance can be obtained.

Meanwhile, the right half of the pixel of FIG. 8A shows the alignment state of the LC molecule when "Y", an electric field is applied in the X direction between the common electrode 133b (of the common electrode line 131) and the vertical part 174c of the pixel electrode. In this "Y" case, the two axes $n_1$ and $n_2$ with the positive dielectric anisotropy rotate on the XY plane, so that an optical axis 1 of the LC molecule 300, which is the sum of vectors of the two axes $n_1$ and $n_2$, becomes parallel to the transmission axis of the polarizer 12. Accordingly, light passing through the polarizer 12 passes through the LC layer 3, and is then blocked by the transmission axis of the analyzer 22. Thus, the "Y" pixels of the LCD screen appear "black".

The "N" and "Y" alignment state(s) of the LC molecule 300 shown in the pixel of FIG. 8B is equal to that of FIG. 8A. However, differing from the pixel of FIG. 8A, the transmission axis of the polarizer 12 of the pixel of FIG. 8B is formed at an angle of θ (e.g., θ equals 45 degrees) to the X direction that is perpendicular to the field-generating electrodes 133a, 133b, and 174c; and the transmission axis of the analyzer 22 of the pixel of FIG. 8B is perpendicular to the transmission axis of the polarizer 12. In this configuration, if the transmission axes of the polarizer 12 and the analyzer 22 are rotated by a any (e.g., predetermined) angle in the same direction and the LC molecule 300 is also rotated in the same direction, the results of FIG. 8B becomes equal to those of FIG. 8A.

In the "N" left half of FIG. 8B, the optical axis 1 of the LC molecule 300 is parallel to the transmission axis of the polarizer 12, while being perpendicular to the transmission axis of the analyzer 22. Accordingly, light that is polarized by the polarizer 12 travels through the LC layer 3 without a change of the polarization state and is then blocked by the analyzer 22. At this time, the "N" pixels of the LCD screen appear "black".

Conversely, the "Y" right half of FIG. 8B shows the alignment state of the LC molecule when an electric field is applied in the X direction between the common electrode 133b (of the common electrode line 131) and the vertical part 174c of the pixel electrode. In this case, the two axes $n_1$ and $n_2$ with the positive dielectric anisotropy rotate on the XY plane, so that an optical axis 1 of the LC molecule 300, which is the sum of vectors of the two axes $n_1$ and $n_2$, is formed in the X direction and thus at an angle of θ to the transmission axis of the polarizer 12. Accordingly, when light that is polarized by the polarizer 12 travels through the LC layer 3, the light is converted into a component that is parallel to the transmission axis of the analyzer 22, thereby exiting the analyzer 22. At this time, the "Y" pixels of the LCD screen appear "white" (or color with luminance). In this case, if the thickness d of the LC layer 3 is controlled so that the light exhibits a phase difference of 180° before and after passing through the LC layer 3, the greatest brightness state, (in which the largest possible amount of light exits the LCD), can be obtained. In other words, if the thickness d of the LC layer 3 is controlled so that the light that is linearly polarized by the LC molecule 300 rotates 90°, the "white" state with the maximum luminance can be obtained.

Figure 9A:
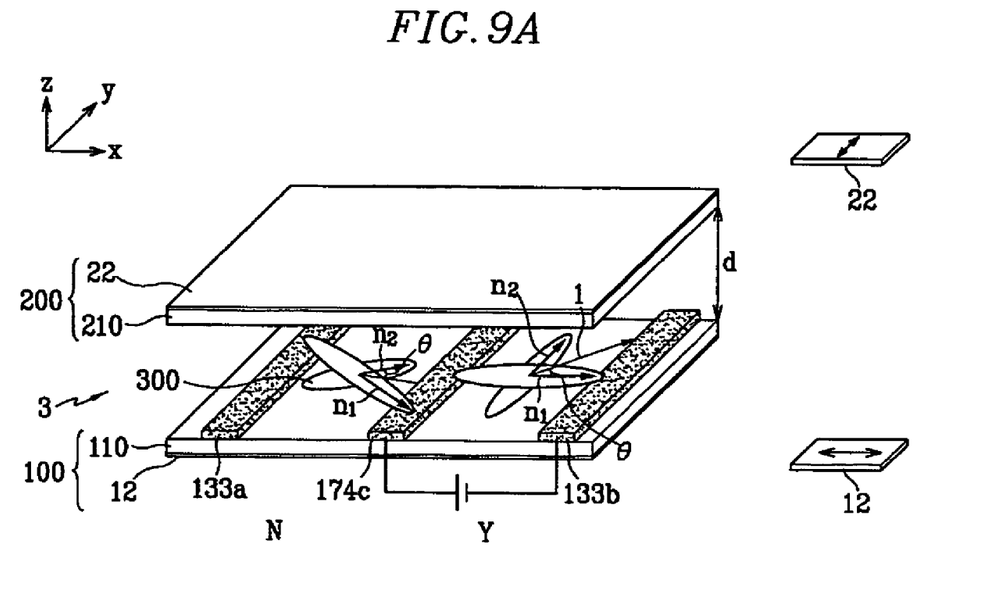
FIG. 9A and FIG. 9B show the alignment states of the LC molecule of FIG. 1 whose two long axes have different dielectric anisotropic characteristics from each other.
Figure 9B:
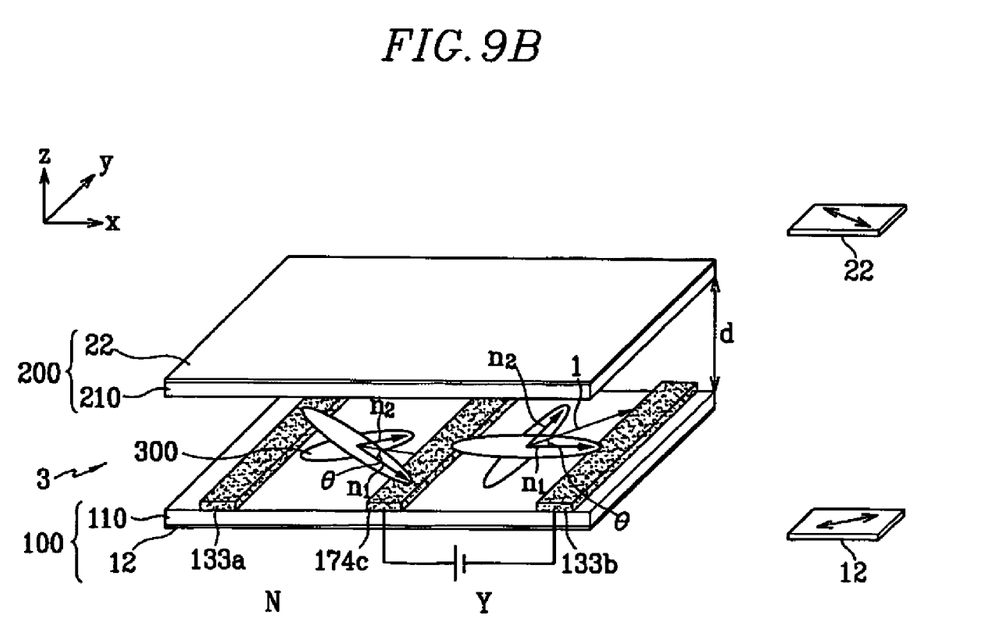

FIG. 9A and FIG. 9B show the alignment states of the LC molecule 300 in FIGS. 6 and 7 whose two long axes $n_1$ and $n_2$ have different (opposite) dielectric anisotropic characteristics from each other.

The "N" left half of the pixel of FIG. 9A shows the alignment state of the LC molecule 300 to which no electric field is applied. In this case, the LC molecule 300 has three axes $n_1$, $n_2$, and $n_{12}$ that are aligned in the X, Y, and Z directions, respectively ($n_{12}$ is not shown). Particularly, the second axis $n_2$ is formed at an angle of θ to the transmission axis of the polarizer 12, and the first axis $n_1$ is formed at an angle of 90-θ to the transmission axis of the polarizer 12 and t.

In this case, an optical axis 1 of the LC molecule 300 with "N", no electric field, is parallel to the transmission axis of the polarizer 12, while being perpendicular to the transmission axis of the analyzer 22. Accordingly, light that is polarized by the polarizer 12 travels through the LC molecules 300 without a change of the polarization state, so that the transmission axis of the analyzer 22 blocks the light. At this time, the "N" pixels of the LCD screen appear "black".

Conversely, the "Y" right half of the pixel of FIG. 9A shows the alignment state of the LC molecule when an electric field is applied in the X direction between the common electrode 133b (of the common electrode line 131) and the vertical part 174c of the pixel electrode. In this case, the first axis $n_1$ having the positive dielectric anisotropy is oriented in the field-applied direction (i.e., in the X direction) and the second axis $n_2$ is oriented in a direction that is perpendicular to the X direction. Accordingly, since the optical axis 1 of the LC molecule 300 is formed at an angle of θ to the transmission axis of the polarizer 12, when light that is polarized by the polarizer 12 travels through the LC layer 3, the light is converted into a component that is parallel to the transmission axis of the analyzer 22, thereby exiting the analyzer 22. At this time, the "Y" pixels of the LCD screen appear "white".

The "N" and "Y" alignment state(s) of the LC molecules 300 shown in FIG. 9B are equal to that of FIG. 9A. However, differing from FIG. 9A, the transmission axis of the polarizer 12 is formed at an angle of θ to the X direction that is perpendicular to the field-generating electrodes 133a, 133b, and 174c, and the transmission axis of the analyzer 22 is perpendicular to the transmission axis of the polarizer 12.

The "N" left half of the pixel of FIG. 9B shows the alignment state of an LC molecule 300 to which no electric field is applied. In this case, the optical axis 1 of the LC molecule 300 is formed at an angle of θ to the transmission axis of the polarizer 12. Accordingly, when light travels through the LC layer 3 after passing through the polarizer 12, the light is converted into a component that is parallel to the transmission axis of the analyzer 22, thereby exiting the analyzer 22. At this time, the "N" pixels of the LCD screen appear "white".

Conversely, the "Y" right half of the pixel of FIG. 9B shows the alignment state of the LC molecule 300 when an electric field is applied in the X direction between the common electrode 133b (of the common electrode line 131) and the vertical part 174c of the pixel electrode. In this case, the first axis $n_1$ having the positive dielectric anisotropy is oriented in the field-applied direction (i.e., in the X direction) and the second axis $n_2$ (having negative dielectric anisotropy) is oriented in a direction that is perpendicular to the X direction. Accordingly, since the optical axis 1 of the LC molecule 300 becomes parallel to the transmission axis of the polarizer 12, light that is polarized by the polarizer 12 travels through the LC molecules 300 without a change of the polarization state. Then, the light is blocked by the analyzer 22, so that the "Y" pixels in the LCD screen appear "black".

As mentioned above, each LC molecule has two long axes that individually act as a motional axis and a control axis when an electric field is applied thereto and which improves response speed. Also, when the LC molecule with the cross-shaped structure is suitably aligned, a viewing angle of the LCD and visibility are improved.

The present invention is applicable to all LCD modes including a TN mode, an IPS mode, and a VA mode.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A liquid crystal display comprising:
  a plurality of liquid crystal molecules, wherein each of the liquid crystal molecules includes a first rodlike portion having a first long axis and a second rodlike portion having a second long axis, and has a third rodlike portion having a third axis substantially perpendicular to the plane including the first long axis and the second long axis, wherein the first rodlike portion crosses the second rodlike portion.

2. The liquid crystal display of claim 1, wherein the third rodlike portion is shorter than the first rodlike portion and the second rodlike portion.

3. The liquid crystal display of claim 1, further comprising a polarizer and an analyzer that are respectively attached to a first panel and a second panel, wherein the plurality of liquid crystal molecules are interposed between the first panel and the second panel.

4. The liquid crystal display of claim 3, wherein the sum of vectors of the first long axis and the second long axis is parallel to the transmission axis of the polarizer.

5. The liquid crystal display of claim 3, wherein the sum of vectors of the first long axis and the second long axis is formed at an angle of θ to the transmission axis of the polarizer.

6. The liquid crystal display of claim 3, wherein the transmission axis of the polarizer is perpendicular to the transmission axis of the analyzer.

7. The liquid crystal display of claim 1, wherein the first rodlike portion of each liquid crystal molecule has positive dielectric anisotropy and the second rodlike portion of each liquid crystal molecule has negative dielectric anisotropy.

8. The liquid crystal display of claim 1, wherein both of the first rodlike portion of each liquid crystal molecule and the second rodlike portion of each liquid crystal molecule have positive dielectric anisotropy.

9. The liquid crystal display of claim 1, wherein the first rodlike portion of each liquid crystal molecule and the second rodlike portion of each liquid crystal molecule are mutually crossed at a right angle.

10. The liquid crystal display of claim 1, further comprising:
   a first panel;
   a second panel, opposite to the first panel; and
   two field-generating electrodes that are included in at least one of the two panels;
   wherein the plurality of liquid crystal molecules are interposed between the first panel and the second panel.

11. The liquid crystal display of claim 10, wherein the two field-generating electrodes are respectively formed on the first panel and the second panel.

12. The liquid crystal display of claim 10, wherein the two field-generating electrodes are formed to be parallel on either of the first and second panels.

13. The liquid crystal display of claim 10, wherein the two field-generating electrodes are both formed on either one of the first and second panels.

14. A liquid crystal display comprising:
   a plurality of liquid crystal molecules,
   wherein each of the liquid crystal molecules has a first rodlike portion having a first axis and a second rodlike portion having a second axis, and has a third rodlike portion having a third axis substantially perpendicular to the plane including the first long axis and the second long axis, wherein the first rodlike portion and the second rodlike portion of each liquid crystal molecule are mutually crossed.

15. The liquid crystal display of claim 14, wherein the first axis is perpendicular to the second axis.

16. The liquid crystal display of claim 15, wherein the first axis is a motional axis, and the second axis is a control axis.

17. The liquid crystal display of claim 15, wherein the third rodlike portion is shorter than the first rodlike portion and the third rodlike portion is shorter than the second rodlike portion.

18. The liquid crystal display of claim 15, wherein the optical axis of the molecule is the sum of vectors of the first axis and of the second axis.

19. An electro-optical switch comprising:
   a plurality of liquid crystal molecules, wherein each of the liquid crystal molecules has a first rod like portion having a first axis and a second rod like portion having a second axis, and has a third rodlike portion having a third axis substantially perpendicular to the plane including the first long axis and the second long axis, wherein the first rod like portion and the second rodlike portion of each liquid crystal molecule are mutually crossed.

20. The electro-optical switch of claim 19, wherein the first axis is a motional axis and the second axis is a control axis.

21. The electro-optical switch of claim 19, wherein the first rodlike portion has a positive dielectric anisotropy.

22. The electro-optical switch of claim 21, wherein the second rodlike portion has a negative dielectric anisotropy.

23. The electro-optical switch of claim 19, wherein the first axis is perpendicular to the second axis.

* * * * *